(12) United States Patent
Iseda et al.

(10) Patent No.: US 10,519,533 B2
(45) Date of Patent: Dec. 31, 2019

(54) HIGH CR-BASED AUSTENITIC STAINLESS STEEL

(71) Applicant: NIPPON STEEL & SUMITOMO METAL CORPORATION, Tokyo (JP)

(72) Inventors: Atsuro Iseda, Tokyo (JP); Hiroyuki Semba, Tokyo (JP); Hirokazu Okada, Tokyo (JP); Hiroyuki Hirata, Tokyo (JP); Toshihide Ono, Tokyo (JP); Katsuki Tanaka, Tokyo (JP); Tomoaki Hamaguchi, Tokyo (JP); Kana Jotoku, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 119 days.

(21) Appl. No.: 15/570,270

(22) PCT Filed: Jun. 3, 2016

(86) PCT No.: PCT/JP2016/066696
§ 371 (c)(1),
(2) Date: Oct. 27, 2017

(87) PCT Pub. No.: WO2016/204005
PCT Pub. Date: Dec. 22, 2016

(65) Prior Publication Data
US 2018/0142334 A1 May 24, 2018

(30) Foreign Application Priority Data

Jun. 15, 2015 (JP) ................... 2015-120592

(51) Int. Cl.
*C22C 38/60* (2006.01)
*C22C 38/00* (2006.01)
*C21D 9/08* (2006.01)
*C22C 38/04* (2006.01)
*C22C 38/06* (2006.01)
*C22C 38/42* (2006.01)
*C22C 38/44* (2006.01)
*C22C 38/46* (2006.01)
*C22C 38/48* (2006.01)
*C22C 38/50* (2006.01)
*C22C 38/52* (2006.01)
*C22C 38/54* (2006.01)
*C22C 38/58* (2006.01)
*C21D 9/46* (2006.01)
*C21D 8/00* (2006.01)
*C21D 6/00* (2006.01)

(52) U.S. Cl.
CPC .............. *C22C 38/60* (2013.01); *C21D 8/005* (2013.01); *C21D 9/08* (2013.01); *C21D 9/46* (2013.01); *C22C 38/00* (2013.01); *C22C 38/001* (2013.01); *C22C 38/005* (2013.01); *C22C 38/04* (2013.01); *C22C 38/06* (2013.01); *C22C 38/42* (2013.01); *C22C 38/44* (2013.01);
*C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *C21D 6/004* (2013.01)

(58) Field of Classification Search
CPC ....... C22C 38/60; C22C 38/00; C22C 38/001;
C22C 38/005; C22C 38/04; C22C 38/06;
C22C 38/42; C22C 38/44; C22C 38/46;
C22C 38/48; C22C 38/50; C22C 38/52;
C22C 38/54; C22C 38/58; C21D 8/005;
C21D 9/08; C21D 9/46
USPC ......................................................... 420/585
See application file for complete search history.

(56) References Cited

U.S. PATENT DOCUMENTS

| | | | |
|---|---|---|---|
| 8,133,431 B2 * | 3/2012 | Osuki | C22C 38/001 148/327 |
| 2004/0234408 A1 | 11/2004 | Semba et al. | |
| 2010/0034689 A1 | 2/2010 | Hirata et al. | |
| 2010/0054983 A1 | 3/2010 | Osuki et al. | |
| 2012/0141318 A1 | 6/2012 | Osuki et al. | |
| 2012/0279607 A1 | 11/2012 | Nishiyama et al. | |
| 2013/0130058 A1 | 5/2013 | Iseda et al. | |
| 2013/0156628 A1 | 6/2013 | Forbes Jones et al. | |
| 2015/0010425 A1 | 1/2015 | Osuki et al. | |
| 2015/0203944 A1 | 7/2015 | Mentz et al. | |

FOREIGN PATENT DOCUMENTS

| | | | |
|---|---|---|---|
| CA | 2 603 681 A1 | 10/2006 | |
| CA | 2 836 874 A1 | 11/2012 | |
| CA | 2 885 080 A1 | 9/2014 | |
| DE | 10 2012 014 068 B3 | 1/2014 | |
| EP | 1 471 158 A1 | 10/2004 | |
| EP | 1471158 A1 * | 10/2004 | ........... C22C 19/055 |

(Continued)

OTHER PUBLICATIONS

Office Action dated Nov. 6, 2018, in Canadian Patent Application No. 2,982,247.

(Continued)

*Primary Examiner* — Anthony J Zimmer
*Assistant Examiner* — Ricardo D Moreles
(74) *Attorney, Agent, or Firm* — Birch, Stewart, Kolasch & Birch, LLP

(57) ABSTRACT

A high Cr austenitic stainless steel with a chemical composition consisting of in terms of % by mass, 0.03 to 0.12% of C, 0.10 to 1.00% of Si, 0.10 to 3.00% of Mn, 0.030% or less of P, 0.020% or less of S, 21.50 to 28.00% of Cr, more than 26.00 and not more than 35.00% of Ni, more than 2.00 and not more than 5.00% of W, 0.80% or less of Co, 0.01 to 0.70% of V, 0.15 to 1.00% of Nb, 0.001 to 0.040% of Al, 0.0001 to 0.0100% of B, 0.010 to 0.400% of N, 0.001 to 0.200% of Zr, 0.001 to 0.200% of Nd, 0.001 to 0.200% of Ta, 0.020 to 0.200% of Ta+0.8Nd+0.5Zr, 0.025% or less of Ti+Sn+Sb+Pb+As+Bi, 0.0090% or less of O, and a remainder consisting of Fe and impurities.

16 Claims, No Drawings

(56) References Cited

FOREIGN PATENT DOCUMENTS

| JP | 2510206 B2 | 6/1996 |
| JP | 2001-107196 A | 4/2001 |
| JP | 2002-212634 A | 7/2002 |
| JP | 2005-23353 A | 1/2005 |
| JP | 3838216 B2 | 10/2006 |
| JP | 4258678 B1 | 4/2009 |
| JP | 4946758 B2 | 6/2012 |
| JP | 5029788 B1 | 9/2012 |
| JP | 5661001 B2 | 1/2015 |
| JP | 5670103 B2 | 2/2015 |
| KR | 10-2004-0092410 A | 11/2004 |
| WO | WO 2009/044802 A1 | 4/2009 |
| WO | WO 2011/155296 A1 | 12/2011 |
| WO | WO 2013/130139 A2 | 9/2013 |

OTHER PUBLICATIONS

International Search Report for PCT/JP2016/066696 (PCT/ISA/210) dated Aug. 30, 2016.
Written Opinion of the International Searching Authority for PCT/JP2016/066696 (PCT/ISA/237) dated Aug. 30, 2016.
Office Action dated Dec. 4, 2018, in Korean Patent Application No. 10-2017-7029799, with partial English translation.
Extended European Search Report dated Oct. 24, 2018, in European Patent Application No. 16811480.9.

\* cited by examiner

HIGH CR-BASED AUSTENITIC STAINLESS STEEL

TECHNICAL FIELD

The present invention relates to high Cr-based austenitic stainless steel.

BACKGROUND ART

There has been an advancing tendency since 1990s in Japan with respect to a boiler toward high temperature and high pressure, and the current mainstream is an Ultra Super Critical power (USC) boiler for a steam temperature beyond 600° C.

In other areas of the world, including Europe or China, highly efficient USC boilers have been constructed one after another from the viewpoint of $CO_2$ reduction as a global environmental countermeasure.

As a source material steel to be used for a heat exchanger tube to generate high temperature high pressure steam in a boiler, and for a pipe of a boiler, a steel material with superior high temperature strength has been demanded and various steel materials have been developed recently.

For example, Patent Literature 1 discloses, as a high Cr-based austenitic stainless steel, a high strength austenitic stainless steel superior in high temperature strength and suitable for a material of a chemical plant vessel using petroleum and coal as a fuel, a material of a heat exchanger, or a material of a high temperature component such as a boiler tube or a fast reactor.

Patent Literature 2 discloses an austenitic stainless steel pipe superior in creep rupture strength at a high temperature for a long time period, and suitable for a material to be used in a high temperature and high pressure environment, such as a steel tube or pipe for a boiler, or a high temperature pressure vessel.

Patent Literature 3 discloses a high temperature austenite stainless steel which is superior in workability after long term use and is suitable for a material for a steel tube or pipe to be used as a superheater pipe or a reheater pipe of a boiler, a reacting furnace pipe in a chemical plant, etc, or as a material for a steel plate, a steel bar, a steel forging, etc. to be used as a heat-resistant, and pressure-resistant component.

Patent Literature 4 discloses an austenite stainless steel, which is superior in high temperature corrosion thermal fatigue cracking resistance, is able to withstand an environment subjected to high temperature corrosion at 500° C. or higher as well as repeated thermal fatigue, and is suitable for a pipe, a plate, a bar, a forging, etc. to be used for a heat exchanger component of a HRSG (Heat Recovery Steam Generator) or a next-generation solar power generator, or a heat-resistant and pressure-resistant component for a power generation boiler, a chemical plant, an atomic power plant, etc.

Patent Literature 5 discloses a high strength austenite stainless steel which is superior in toughness after aging, is applicable to a high strength steel tube or pipe for a boiler, etc, and is usable for ultra-supercritical coal fired power generation, integrated coal gasification combined cycle power generation, etc.

Patent Literature 6 discloses a high strength austenite stainless steel to be used for ultra-supercritical coal fired power generation, integrated coal gasification combined cycle power generation, or the like.

Patent Literature 1: Japanese Patent No. 2510206
Patent Literature 2: Japanese Patent Application Laid-Open (JP-A) No. 2002-212634
Patent Literature 3: Japanese Patent No. 4946758
Patent Literature 4: Japanese Patent No. 5029788
Patent Literature 5: Japanese Patent No. 5661001
Patent Literature 6: Japanese Patent No. 5670103

SUMMARY OF INVENTION

Technical Problem

Generally, in designing the chemical composition of a material steel to be used for a heat exchanger tube used in a high temperature range, importance is placed on high temperature strength (for example, creep strength), high temperature corrosion resistance, steam oxidation resistance, thermal fatigue resistance, etc., and corrosion resistance in a normal temperature range (for example, corrosion resistance in water) is less valued.

Further, in the case of a high Cr-based stainless steel with a Cr content of 21.50% or more by mass, it has been believed that stress corrosion cracking itself does not take place.

However, there arises recently a big problem that stress corrosion cracking occurs in water in a range of room temperature to low temperature (approximately 350° C. or less) due to an inhomogeneous metallic structure or precipitation of a heterogeneous carbide, etc. at a heating processed portion, such as a welded portion or a bending portion.

For example, during a hydrostatic pressure test of a boiler, or a shut-down of a boiler, since water is stored for an extended period of time inside heat exchanger tubes, stress corrosion cracking may occur remarkably.

Stress corrosion cracking may occur, because a crystal grain boundary becomes susceptible to selective corrosion due to precipitation of a Cr-based carbide or generation of a zone with a low Cr concentration (Cr depleted zone) in the vicinity of a crystal grain boundary.

As a method of preventing stress corrosion cracking of an 18Cr-based austenitic stainless steel, heretofore:

a method of suppressing formation of a grain boundary Cr carbide by reduction of a C amount (a low carbon addition method), a method of suppressing formation of a grain boundary Cr carbide by addition of Nb and Ti, which have higher capability of forming a carbide than Cr, to form a MC carbide to fix C (a stabilizing heat treatment method), a method of suppressing formation of a Cr depleted zone by addition of Cr at 21.50% or more to suppress selective corrosion at a grain boundary (a method of adding a large amount of Cr), or the like is known.

There is, however, a drawback in any of the methods.

An 18 Cr-based austenitic stainless steel obtained by the low carbon addition method or the stabilizing heat treatment method cannot be utilized in a high temperature environment of 750° C. or higher, or a severe high temperature corrosive environment caused by a fuel to be used, because the oxidation resistance, high temperature corrosion resistance, and high temperature strength thereof are insufficient in such environments.

Consequently, an austenitic stainless steel to be used in such a high temperature environment or a high temperature corrosive environment is required to contain Cr at 21.50% or more by mass according to the method of adding a large amount of Cr.

However, a problem has arisen recently with respect to stress corrosion cracking occurring in the extreme environment (severe environment in terms of stress corrosion cracking), which a conventional high Cr-based stainless steel, or a conventional art cannot cope with.

Such stress corrosion cracking in an extreme environment (severe environment in terms of stress corrosion cracking) occurs due to a cause, such as "sensitization of material" (namely, a phenomenon in which a Cr-based carbonitride precipitates in the vicinity of crystal grain boundaries, whereby the Cr concentration in the vicinity of crystal grain boundaries is decreased, and consequently grain boundary corrosion is promoted), a special corrosive environment factor (for example, entry of seawater into a pipe), or equipment not free from a large residual strain (residual strain remaining after welding or processing).

Such stress corrosion cracking of a high Cr-based austenitic stainless steel occurring in the extreme environment (severe environment in terms of stress corrosion cracking) has been heretofore not taken into consideration at all, and there has been no effective conventional art thereon. Therefore, a proposal of a new material is demanded.

Superior high temperature strength is also required for high Cr-based austenitic stainless steel.

An object of the invention is to provide a high Cr-based austenitic stainless steel that contains Cr in an amount of 21.50% or more by mass, that is able to secure stress corrosion cracking resistance even in an extreme environment (severe environment in terms of stress corrosion cracking), which was heretofore left out of consideration, and that is also superior in high temperature strength.

Solution to Problem

The means for achieving the object includes the following aspects.

<1> A high Cr-based austenitic stainless steel with a chemical composition consisting of in terms of % by mass:
0.03 to 0.12% of C,
0.10 to 1.00% of Si,
0.10 to 3.00% of Mn,
0.030% or less of P,
0.020% or less of S,
21.50 to 28.00% of Cr,
more than 26.00 and not more than 35.00% of Ni,
more than 2.00 and not more than 5.00% of W,
0.80% or less of Co,
0.01 to 0.70% of V,
0.15 to 1.00% of Nb,
0.001 to 0.040% of Al,
0.0001 to 0.0100% of B,
0.010 to 0.400% of N,
0.001 to 0.200% of Zr,
0.001 to 0.200% of Nd,
0.001 to 0.200% of Ta,
0.020 to 0.200% of Ta+0.8Nd+0.5Zr,
0.010% or less of Ti,
0.010% or less of Sn,
0.010% or less of Sb,
0.001% or less of Pb,
0.001% or less of As,
0.001% or less of Bi,
0.025% or less of Ti+Sn+Sb+Pb+As+Bi,
0.0090% or less of O,
4.00% or less of Cu,
2.00% or less of Mo,
0.20% or less of Ca,
0.20% or less of Mg,
0.20% or less in total of one or more of Y, Sc, Hf, Re, or lanthanoid elements other than Nd, and
a remainder consisting of Fe and impurities.

<2> The high Cr-based austenitic stainless steel according to <1>, wherein the chemical composition comprises, in terms of % by mass, 0.01 to 0.80% of Co.

<3> The high Cr-based austenitic stainless steel according to <1> or <2>, wherein the chemical composition comprises, in terms of % by mass, one or more of: 0.01 to 4.00% of Cu, 0.01 to 2.00% of Mo, 0.0001 to 0.20% of Ca, or 0.0005 to 0.20% of Mg.

<4> The high Cr-based austenitic stainless steel according to any one of <1> to <3>, wherein the chemical composition comprises, in terms of % by mass, 0.001 to 0.20% in total of one or more of Y, Sc, Hf, Re, or lanthanoid elements other than Nd.

<5> The high Cr-based austenitic stainless steel according to any one of <1> to <4>, wherein a creep rupture strength at 750° C. and 100,000 hours is 50 MPa or more.

Advantageous Effects of Invention

According to the invention a high Cr-based austenitic stainless steel that contains Cr in an amount of 21.50% or more by mass, that is able to secure stress corrosion cracking resistance even in an extreme environment (severe environment in terms of stress corrosion cracking), which was heretofore left out of consideration, and that is also superior in high temperature strength, is provided.

DESCRIPTION OF EMBODIMENTS

Embodiments of the invention will be described below.

A numerical range expressed by "x to y" herein includes the values of x and y in the range as the lower and upper limit values, respectively.

The content of an element expressed by "%", the value of "Ta+0.8Nd+0.5Zr" expressed by "%", and the value of "Ti+Sn+Sb+Pb+As+Bi" expressed by "%" mean herein respectively "% by mass".

The content of C (carbon) may be herein occasionally expressed as "C content". The content of another element may be expressed similarly.

An austenitic stainless steel of the embodiment (hereinafter also referred to as the "steel of the embodiment") is an austenitic stainless steel with a chemical composition consisting of in terms of % by mass: 0.03 to 0.12% of C, 0.10 to 1.00% of Si, 0.10 to 3.00% of Mn, 0.030% or less of P, 0.020% or less of S, 21.50 to 28.00% of Cr, more than 26.00 and not more than 35.00% of Ni, more than 2.00 and not more than 5.00% of W, 0.80% or less of Co, 0.01 to 0.70% of V, 0.15 to 1.00% of Nb, 0.001 to 0.040% of Al, 0.0001 to 0.0100% of B, 0.010 to 0.400% of N, 0.001 to 0.200% of Zr, 0.001 to 0.200% of Nd, 0.001 to 0.200% of Ta, 0.020 to 0.200% of Ta+0.8Nd+0.5Zr, 0.010% or less of Ti, 0.010% or less of Sn, 0.010% or less of Sb, 0.001% or less of Pb, 0.001% or less of As, 0.001% or less of Bi, 0.025% or less of Ti+Sn+Sb+Pb+As+Bi, 0.0090% or less of O, 4.00% or less of Cu, 2.00% or less of Mo, 0.20% or less of Ca, 0.20% or less of Mg, 0.20% or less in total of one or more of Y, Sc, Hf, Re, or lanthanoid elements other than Nd, and a remainder consisting of Fe and impurities.

The steel of the embodiment is a high Cr-based austenitic stainless steel containing Cr in an amount of 21.50% or more by mass.

As described above, there has been recently a problem of stress corrosion cracking occurring in an extreme environment (severe environment in terms of stress corrosion cracking), which a conventional high Cr-based stainless steel, or a conventional art cannot cope with.

With the steel of the embodiment, stress corrosion cracking resistance can be secured also in an extreme environment (severe environment in terms of stress corrosion cracking), which has been heretofore not taken into consideration.

The reason of such an effect to be obtained with the steel of the embodiment is presumed as follows, provided that the invention be not restricted in any way by the following presumption.

Through investigations by the inventors, it has become clear that, when appropriate amounts of 3 elements of Ta, Nd, and Zr are added combinedly to a highly purified high Cr-based austenitic steel, the stress corrosion cracking resistance is remarkably improved through a synergistic effect of the combined addition.

Although independent addition of any of the 3 elements, or partly combined addition of the same has been heretofore known, combined addition of the 3 elements for improving the stress corrosion cracking resistance of a high Cr-based austenitic stainless steel has not yet been known.

Further, through investigations by the inventors, it has become clear that the synergistic effect of the 3 elements is exhibited remarkably by treating Ti, which has been heretofore treated as an effective addition element, as an impurity element, and limiting the content of impurity elements including the Ti (specifically, Ti, Sn, Sb, Pb, As, Bi, O, etc.) so as to attain a high purity of a high Cr-based austenitic stainless steel.

Although addition of C and N is essential from the viewpoint of maintenance of the strength in a high temperature environment of from 700° C. to 750° C., precipitation of a Cr-based carbonitride at a grain boundary will cause stress corrosion cracking.

In the steel of the embodiment, the amount of Ti, which creates a coarse carbonitride, is reduced to the extent possible, and in conjunction therewith, the amount of an impurity which may weaken grain boundaries and cause stress corrosion cracking is also reduced. As a result, stress corrosion cracking caused by precipitation of a Cr-based carbonitride at a grain boundary may be suppressed.

The steel of the embodiment is superior in high temperature strength (for example, creep rupture strength).

The reason behind the superior high temperature strength of the steel of the embodiment is presumed to be that fine dispersion of a stable carbonitride and precipitation strengthening of a fine and stable Laves phase are achieved owing to actions of combined addition of the 3 elements of Ta, Nd, and Zr, an appropriate amount of W, and the like.

With the steel of the embodiment, for example, a strength that is at least 1.4 times higher than a creep rupture strength at 750° C. and 100,000 hours of a conventional general-purpose steel may be obtained.

The chemical composition of the steel of the embodiment and its preferable mode will be described below.

C: 0.03 to 0.12%

C is an essential element for formation of a carbide, and stabilization of an austenitic structure, as well as improvement of high temperature strength and stabilization of a metallic structure at a high temperature.

However, when the C content is less than 0.03%, it is difficult for a high Cr-based austenitic stainless steel to maintain its high temperature creep strength and a sound metallic structure at a high temperature. Therefore, the C content is 0.03% or more, and is preferably 0.04% or more.

When the C content exceeds 0.12%, a coarse Cr-based carbide precipitates at a crystal grain boundary, which may cause stress corrosion cracking or welding cracking to reduce toughness. Therefore, the C content is 0.12% or less, and is preferably 0.10% or less.

Si: 0.10 to 1.00%

Si is an element which functions as a deoxidizing agent during steel making, and prevents steam oxidation at a high temperature. However, when the Si content is less than 0.10%, the addition effect cannot be obtained adequately. Therefore, the Si content is 0.10% or more, and is preferably 0.15% or more.

When the Si content exceeds 1.00%, the workability decreases, and a brittle phase such as a σ-phase precipitates at a high temperature. Therefore, the Si content is 1.00% or less, and is preferably 0.60% or less.

Mn: 0.10 to 3.00%

Mn is an element which makes S harmless by forming MnS with S as an impurity element to contribute to improvement of a hot workability, as well as to stabilization of a metallic structure at a high temperature.

When N, which is essential for securing the strength, is added in a high Cr-based austenitic stainless steel, addition of Mn is especially effective.

When the Mn content is less than 0.10%, the addition effect cannot be obtained adequately. Therefore, the Mn content is 0.10% or more, and is preferably 0.30% or more.

When the Mn content exceeds 3.00%, the workability and weldability decrease. Therefore, the Mn content is 3.00% or less, and is preferably 2.70% or less.

P: 0.030% or less

P is an impurity element, which disturbs workability and weldability.

When the P content exceeds 0.030%, the workability and weldability decrease remarkably. Therefore, the P content is 0.030% or less, and is preferably 0.020%.

Preferably the P content is as low as possible, and may be even 0%.

However, P may inevitably get mixed in from steel raw materials (raw material ore, scrap, etc.), and reduction of the P content to below 0.001% will increase the production cost greatly. Therefore, the P content may be 0.001% or more from the viewpoint of production cost.

S: 0.020%% or less

S is an impurity element, which disturbs workability, weldability, and stress corrosion cracking resistance.

When the S content exceeds 0.020%, the workability, weldability, and stress corrosion cracking resistance decrease remarkably. Therefore the S content is 0.020% or less.

Even in a case in which S is added for improvement of molten metal flow in welding, S is added at a content of 0.020% or less. The S content is preferably 0.010% or less.

Preferably the S content is as low as possible, and may be even 0%.

However, S may inevitably get mixed in from steel source materials (raw material ore, scrap, etc.) and reduction of the S content to below 0.001% will increase the production cost greatly. Therefore, the S content may be 0.001% or more from the viewpoint of production cost.

Cr: 21.50 to 28.00%

Cr is a major element of a high Cr-based austenitic stainless steel, which contributes to improvement of high temperature corrosion resistance and stress corrosion cracking resistance, as well as to improvement of the strength and stabilization of a metallic structure with a Cr carbonitride.

Especially, in a case in which importance is placed on high temperature corrosion resistance and stress corrosion cracking resistance, when the Cr content is less than 21.50%, adequate high temperature corrosion resistance and stress corrosion cracking resistance cannot be obtained. Therefore, the Cr content is 21.50% or more, and is preferably 22.00% or more.

When the Cr content exceeds 28.00%, a brittle phase such as a σ-phase is formed to deteriorate the high temperature strength, toughness, workability, and weldability. Therefore, the Cr content is 28.00% or less, and is preferably 27.00% or less, more preferably 26.00% or less, and particularly preferably 26.50% or less.

Ni: more than 26.00 and not more than 35.00%

Ni is a major element of an austenitic stainless steel, which contributes to improvement of high temperature strength and workability as well as to stabilization of a metallic structure at a high temperature. Especially, in the case of an austenite stainless steel with a high Cr content, a considerable amount of Ni is required to be added for stabilizing a metallic structure at a high temperature, and suppressing precipitation of a brittle phase.

When the Ni content is 26.00% or less, the addition effect cannot be obtained adequately. Therefore, the Ni content is more than 26.00%, and preferably 28.00% or more.

When the Ni content exceeds 35.00%, the high temperature strength, weldability, and economic efficiency are decreased. Therefore, the Ni content is 35.00% or less, and is preferably 34.00% or less, more preferably 33.00% or less, and particularly preferably 32.00% or less.

W: more than 2.00 and not more than 5.00%

Since W is slow in diffusion at a high temperature, it is an element, which maintains a stable metallic structure, and a strength in a high temperature range for a long time period to contribute to improvement of stress corrosion cracking resistance, and high temperature strength.

When the W content is 2.00% or less, adequate stress corrosion cracking resistance and high temperature strength cannot be secured. Therefore, the W content is more than 2.00%, and is preferably 2.20% or more.

When the W content exceeds 5.00%, a brittle phase is increased, whereby the workability, strength, and weldability are decreased. Therefore, the W content is 5.00% or less, and is preferably 4.80% or less.

Co: 0.80% or less

Co is an element, which stabilizes a metallic structure to contribute to improvement of high temperature strength. Co is an optional element, and the Co content may be 0%.

From the viewpoint of obtaining the effect of Co more effectively, the Co content is preferably 0.01% or more, and more preferably 0.03% or more.

When the content exceeds 0.80%, the addition effect is saturated, and the Co content becomes high in producing another steel. Therefore, the Co content is 0.80% or less, and is preferably 0.60% or less.

V: 0.01 to 0.70%

V is an element contributing to improvement of high temperature strength by forming a fine carbonitride together with Nb. When the V content is less than 0.01%, a combined effect of combined addition with Nb cannot be obtained. Therefore, the V content is 0.01% or more, and is preferably 0.03% or more.

When the V content exceeds 0.70%, the strength or stress corrosion cracking resistance decreases. Therefore, the V content is 0.70% or less, and is preferably 0.60% or less.

Nb: 0.15 to 1.00%

Nb is an element contributing to improvement of high temperature strength by forming a fine carbonitride together with V, and contributing also to improvement of stress corrosion cracking resistance through suppression of precipitation of a Cr-based carbonitride at a crystal grain boundary by fixing C. Nb is also an element contributing to improvement of the high temperature strength due to precipitation of a fine Laves phase.

When the Nb content is less than 0.15%, the addition effect is not obtained adequately. Therefore, the Nb content is 0.15% or more, and is preferably 0.20% or more.

When the Nb content exceeds 1.00%, a clumpy precipitate is precipitated to decrease the strength, toughness, and stress corrosion cracking resistance. Therefore, the Nb content is 1.00% or less, and is preferably 0.90% or less, more preferably 0.80% or less, and further preferably 0.70% or less.

Al: 0.001 to 0.040%

Al is an element which functions as a deoxidizing element in steel making to purify a steel.

When the Al content is less than 0.001%, purification of a steel cannot be achieved adequately. Therefore, the Al content is 0.001% or more, and is preferably 0.003% or more.

When the Al content exceeds 0.040%, a large amount of nonmetallic inclusion is formed, whereby the stress corrosion cracking resistance, high temperature strength, workability, toughness, and stability of a metallic structure at a high temperature are decreased. Therefore, the Al content is 0.040% or less, and is preferably 0.030% or less, and more preferably 0.020% or less.

B: 0.0001 to 0.0100%

B is an essential element for improvement of the high temperature strength and stress corrosion cracking resistance. Namely, B is an element not only to contribute to improvement of the high temperature strength through segregation at a crystal grain boundary, but also to contribute to formation of a carbonitride, micronization of a Laves phase, and stabilization of a metallic structure, which are effective for improvement of the high temperature strength.

B is also an element, which contributes to improvement of the stress corrosion cracking resistance through a synergistic effect of combined addition with Ta, etc.

When the B content is less than 0.0001%, the addition effect cannot be obtained adequately. Therefore the B content is 0.0001% or more, and is preferably 0.003% or more.

When the B content exceeds 0.0100% the workability, weldability, and high temperature strength decrease remarkably. Therefore the B content is 0.0100% or less, and is preferably 0.0070% or less.

N: 0.010 to 0.400%

N is an element essential for securing a high temperature strength with respect to a high Cr-based austenitic stainless steel through solid solution strengthening and precipitation strengthening with a carbonitride.

N is an essential element for suppressing a brittle phase or stabilizing a metallic structure with respect to a high Cr-based austenitic stainless steel together with Ni, Mn, etc.

When the N content is less than 0.010%, the addition effect cannot be obtained adequately. Therefore, the N content is 0.010% or more, and is preferably 0.050% or more.

When the N content exceeds 0.400%, a blowhole defect is formed in a steel, and a clumpy nitride precipitates at a high temperature, whereby stress corrosion cracking resistance is deteriorated. Therefore the N content is 0.400% or less, and is preferably 0.300% or less.

Zr: 0.001 to 0.200%

Zr is an element, which contributes to improvement of stress corrosion cracking resistance, and high temperature strength by addition of only a trace amount thereof. A Zr nitride or a Zr oxide constitutes a precipitation nucleus for a fine carbonitride in a high Cr-based austenitic stainless steel, such that the stress corrosion cracking resistance is improved.

When the Zr content is less than 0.001%, the addition effect cannot be obtained adequately. Therefore, the Zr content is 0.001% or more, and is preferably 0.003% or more.

When the Zr content exceeds 0.200%, a large amount of Zr nitride or Zr oxide is formed to deteriorate the toughness, workability, corrosion resistance, and weldability. Therefore, the Zr content is 0.200% or less, and is preferably 0.150% or less. Zr is added in an appropriate amount combinedly with Ta and Nd, and the aspect will be described below.

Nd: 0.001 to 0.200%

Nd is an essential element for improving the stress corrosion cracking resistance through a synergistic effect of combined addition with Ta and Zr.

With respect to the steel of the embodiment, as described above, the stress corrosion cracking resistance is improved by micronizing a carbonitride and a Laves phase, by securing the long term stability, and by strengthening a crystal grain boundary through combined addition of Nd and B. However, even when Nd in a form of metal Nd is added, if it precipitates as a clumpy oxide or nitride, Nd is consumed uselessly.

When the Nd content is less than 0.001%, the addition effect is not obtained adequately. Therefore, the Nd content is 0.001% or more, and is preferably 0.003% or more.

When the Nd content exceeds 0.200%, the addition effect is saturated, and an inclusion based on an oxide or a nitride is formed, whereby the stress corrosion cracking resistance, high temperature strength, and weldability are decreased. Therefore, the Nd content is 0.200% or less, and is preferably 0.170% or less, and more preferably 0.150% or less. Nd is added in an appropriate amount combinedly with Ta and Zr, and the aspect will be described below.

Ta: 0.001 to 0.200%

Ta is an element, which contributes to improvement of stress corrosion cracking resistance by addition of only a trace amount thereof. Namely, Ta is an element, which contributes to micronization of a carbonitride, improvement of a long term strength at a high temperature, stabilization of a metallic structure, etc. in a high Cr-based austenitic stainless steel, and from which an excellent effect may be expected by combined addition with Nd and Zr.

When the Ta content is less than 0.001%, the addition effect is not obtained adequately. Therefore, the Ta content is 0.001% or more, and is preferably 0.003% or more.

When the Ta content exceeds 0.200%, an inclusion based on an oxide increases, whereby the stress corrosion cracking resistance, high temperature strength, workability, and weldability are deteriorated. Therefore, the Ta content is 0.200% or less, and is preferably 0.180% or less, and more preferably 0.150% or less. Ta is added in an appropriate amount combinedly with Nd and Zr, and the aspect will be described below.

Ta+0.8Nd+0.5Zr: 0.020 to 0.200%

When Ta, Nd, and Zr are added in appropriate amounts combinedly in a high Cr-based austenitic stainless steel, which contains from 21.50 to 28.00% of Cr, and in which trace amounts of impurity elements including Ti (an impurity element in the case of the steel of the embodiment) are restricted strictly, the stress corrosion cracking resistance is improved remarkably owing to a synergistic effect of the 3 elements.

The synergistic effect is an effect not attainable through independent addition of each element of Ta, Nd, and Zr, but attainable only by combined addition of the 3 elements of Ta, Nd, and Zr.

The synergistic effect of combined addition of the 3 elements is a novel effect discovered by the inventors.

The synergistic effect of combined addition of the 3 elements is:

(a) an effect by which precipitation of a coarse carbonitride causing stress corrosion cracking at a crystal grain boundary is suppressed by combined addition of the 3 elements in an appropriate amount (suppression of sensitization), as a result of which a carbonitride is precipitated in a state finely dispersed in a crystal grain and the stress corrosion cracking resistance is improved;

(b) an effect by which a carbonitride stable for a long time period at a high temperature is formed by combined addition of the 3 elements in an appropriate amount, as a result of which the high temperature creep strength at 700° C. or higher is improved; and (c) an effect by which a W-based Laves phase contributing greatly to a high temperature strength is precipitated finely, and stabilized in a high temperature range, as a result of which a high strength not obtainable with a conventional steel is achieved.

According to the embodiment, in order to rate the action effect of each element of Ta, Nd, and Zr equally, and to evaluate fairly a synergistic effect of combined addition thereof, the amount of "Ta+0.8Nd+0.5Zr" (each element symbol represents the content (% by mass) of each element) is used as an index.

In "Ta+0.8Nd+0.5Zr", the Nd content is multiplied with the atomic weight ratio with respect to Ta, namely 0.8 ($\approx$144 (Nd)/181(Ta)), to get "0.8Nd"; the Zr content is multiplied with the atomic weight ratio with respect to Ta, namely 0.5 ($\approx$=91(Zr)/181(Ta)), to get "0.5Zr"; and the "0.8Nd" and "0.5Zr" are added to the Ta content.

When "Ta+0.8Nd+0.5Zr" is less than 0.020%, the synergistic effect cannot be obtained adequately. Therefore, "Ta+0.8Nd+0.5Zr" is 0.020% or more, and is preferably 0.050% or more, and more preferably 0.080% or more.

When "Ta+0.8Nd+0.5Zr" exceeds 0.200%, the addition effect is saturated, and an inclusion based on an oxide is increased to deteriorate the strength, toughness, weldability, and workability. Therefore, "Ta+0.8Nd+0.5Zr" is 0.200% or less, and is preferably 0.195% or less, more preferably 0.170% or less, and particularly preferably 0.140% or less.

In the steel of the embodiment, for securing the synergistic effect of from 0.020 to 0.200% of "Ta+0.8Nd+0.5Zr", the steel of the embodiment is highly purified by restricting strictly the contents of impurity elements, namely Ti, Sn, Sb, Pb, As, Bi, and O.

Although Ti is ordinarily treated as an effective addition element, it is treated as an impurity element in the steel of the embodiment.

Ti: 0.010% or less

Ti forms a clumpy Ti nitride in an austenitic stainless steel containing a required amount of N. The Ti nitride reduces a synergistic effect of combined addition of Ta, Nd, and Zr and deteriorate remarkably stress cracking resistance, high temperature strength, workability, and weldability.

Consequently, Ti is restricted as an impurity element to the extent possible in the steel of the embodiment. Specifically, the Ti content is limited to 0.010% or less, although it may get mixed inevitably from a steel source material such as a scrap. The Ti content is preferably 0.005% or less.

Since the Ti content is preferably as low as possible, the Ti content may be even 0%.

Sn: 0.010% or less
Sb: 0.010% or less

Sn and Sb, which are impurity elements, may get mixed inevitably from a steel source material such as a scrap, and, once mixed, are hardly removed in a refining process.

For securing superior stress corrosion cracking resistance, both the Sn content and the Sb content should be reduced to the extent possible. Therefore, both of the Sn content and the Sb content are limited to 0.010% or less. The Sn content and the Sb content are preferably 0.005% or less respectively.

Since both the Sn content and the Sb content are preferably as low as possible, the Sn content and the Sb content may be respectively even 0%.

Pb: 0.001% or less
As: 0.001% or less

Pb and As, which are impurity elements, may get mixed inevitably from a steel source material such as a scrap, and, once mixed, are hardly removed in a refining process.

For securing superior stress corrosion cracking resistance, both the Pb content and the As content should be reduced to the extent possible. Therefore, both of the Pb content and the As content are limited to 0.001% or less. The Pb content and the As content are preferably 0.0005% or less respectively.

Since Pb and As are preferably as low as possible, the Pb content and the As content may be respectively even 0%.

Bi: 0.001% or less

Bi, which is an impurity element, is an element that does not get mixed ordinarily, but may get mixed inevitably from a steel source material such as a scrap. Since Bi is an element harmful to high temperature strength or stress corrosion cracking resistance, its content should be reduced to the extent possible. Therefore, the Bi content is limited to 0.001% or less, and is preferably 0.0005% or less.

Since the Bi content is preferably as low as possible, the Bi content may be even 0%.

Ti+Sn+Sb+Pb+As+Bi: 0.025% or less

For securing effectively a synergistic effect of combined addition of Ta, Nd, and Zr in the steel of the embodiment, it is necessary to purify highly a steel not only by limiting the contents of 6 impurity elements (specifically, 6 elements of Ti, Sn, Sb, Pb, As, and Bi) individually, but also by limiting the total content of the 6 impurity elements (namely, Ti+Sn+Sb+Pb+As+Bi).

As per tests by the inventors, when "Ti+Sn+Sb+Pb+As+Bi" (each element symbol represents the content (% by mass) of each element) exceeds 0.025%, the synergistic effect of combined addition of Ta, Nd, and Zr is reduced remarkably (see, for example, Comparative Steel 25 below).

Therefore, for the steel of the embodiment, "Ti+Sn+Sb+Pb+As+Bi" is limited to 0.025% or less. "Ti+Sn+Sb+Pb+As+Bi" is preferably 0.020% or less, and more preferably 0.015% or less.

O: 0.0090% or less

O (oxygen) remaining inevitably after refining a molten steel is an element used as an index of the content of a nonmetallic inclusion. When the O content exceeds 0.0090%, Ta, Nd, and Zr are consumed to form oxides, as a result of which the improvement effect on stress corrosion cracking resistance (synergistic effect of combined addition) does not develop, and the high temperature strength, weldability, workability, and toughness decrease. Therefore, the O content is limited to 0.0090% or less, and is preferably 0.0060% or less, more preferably 0.0030% or less.

Since the O content is preferably as low as possible, the O content may be 0%. However, O may occasionally remain after refining inevitably at 0.0001% or so. Therefore, from the viewpoint of production cost, the O content may be even 0.0001% or more.

The chemical composition of the steel of the embodiment may include in addition to the above elements one or more of Cu, Mo, Ca, or Mg; and/or one or more of Y, Sc, Hf, Re, or lanthanoid elements except Nd.

Any of the elements is an optional element, and therefore each of the contents thereof may be 0%.

Cu: 4.00% or less

Cu is an optional element, and the Cu content may be also 0%.

Cu is an element, which precipitates as a fine Cu phase stable at a high temperature, and contributes to improvement of a long term strength in a high temperature range of 650° C. or less. When the steel of the embodiment contains Cu, the Cu content is preferably 0.01% or more from the viewpoint of obtaining the above effect further effectively, and more preferably 0.10% or more.

When the Cu content exceeds 4.00%, the workability, creep ductility, and strength decrease. Therefore, the Cu content is 4.00% or less, and is preferably 3.50% or less.

Mo: 2.00% or less

Mo is an optional element, and the Mo content may be 0%.

Mo is an element effective for improvement of the high temperature strength, corrosion resistance, and stress corrosion cracking resistance. Mo is an element contributing to formation of a Laves phase or a carbide stable for a long time period at a high temperature through a synergistic effect of combined addition with W. In a case in which the steel of the embodiment contains Mo, from the viewpoint of obtaining the effect more effectively, the Mo content is preferably 0.01% or more, and more preferably 0.02% or more.

When the Mo content exceeds 2.00%, a brittle phase is formed extensively, and the workability, high temperature strength, and toughness are deteriorated. Therefore, the Mo content is 2.00% or less, and is preferably 1.50% or less.

Ca: 0.20% or less

Ca is an optional element, and the Ca content may be 0%.

Ca may be added as a finishing element for deoxidation. Since the steel of the embodiment contains Nd, it is preferable that the steel is deoxidized by Ca in a refining process. When the steel of the embodiment contains Ca, from the viewpoint of obtaining more effectively a deoxidation effect, the Ca content is preferably 0.0001% or more, and more preferably 0.0010% or more.

When the Ca content exceeds 0.20%, the amount of a nonmetallic inclusion increases to lower the high temperature strength, stress corrosion cracking resistance, and toughness. Therefore the Ca content is 0.20% or less, and is preferably 0.15% or less.

Mg: 0.20% or less

Mg is an optional element, and the Mg content may be 0%.

Mg is an element, which contributes to improvement of high temperature strength or corrosion resistance by addition of a trace amount thereof. When the steel of the embodiment contains Mg, from the viewpoint of obtaining more effectively the effect, the Mg content is preferably 0.0005% or more, and more preferably 0.0010% or more.

When the Mg content exceeds 0.20%, the strength, toughness, corrosion resistance, and weldability decrease. Therefore the Mg content is 0.20% or less, and is preferably 0.15% or less.

Total of one or more of Y, Sc, Hf, Re, and lanthanoid elements other than Nd: 0.20% or less Any of Y, Sc, Hf, Re and lanthanoid elements other than Nd (namely, La, Ce, Pr, Pm, Sm, Eu, Gd, Tb, Dy, Ho, Er, Tm, Yb, and Lu) is an optional element, and the total content of the elements may be 0%.

Although Y, Sc, Hf, Re, and lanthanoid elements other than Nd are expensive, they are elements acting to enhance a synergistic effect of combined addition of Ta, Nd, and Zr. When the steel of the embodiment contains one or more of the elements, the total content of the elements is preferably 0.001% or more, and more preferably 0.005% or more.

When the total content exceeds 0.20%, the amount of a nonmetallic inclusion increases, whereby the workability, strength, toughness, corrosion resistance, and weldability decrease. Therefore the total content is 0.20% or less, and is preferably 0.15% or less.

A remainder excluding the aforementioned elements from the chemical composition of the steel of the embodiment is Fe and impurities.

The impurities referred to herein mean one or more of elements other than the aforementioned elements. The contents of the elements (impurities) other than the aforementioned elements are preferably limited to 0.010% or less respectively, and more preferably to 0.001% or less.

The steel of the embodiment is superior in high temperature strength (especially, creep rupture strength) as described above.

There is no particular restriction on the specific range of the high temperature strength of the steel of the embodiment. The creep rupture strength at 750° C. and 100,000 hours of the steel of the embodiment is preferably 50 MPa or more.

In this regard, the "creep rupture strength at 750° C. and 100,000 hours" means a value estimated as an average creep rupture strength at 750° C. and 100,000 hours.

A high temperature strength of 50 MPa or more in terms of a creep rupture strength at 750° C. and 100,000 hours is a high temperature strength that is remarkably superior to the high temperature strength of ASME SA213 TP310HCbN steel, which is used widely in the world as a conventional 25 Cr austenitic stainless steel having the highest temperature strength (see, for example, Inventive Steels 1 to 18, and Comparative Steel 19 in Table 3 below).

The strength less than 50 MPa in terms of a creep rupture strength at 750° C. and 100,000 hours can be attained by an extension of the conventional art. However a high temperature strength of 50 MPa or more in terms of the creep rupture strength can be hardly attained by an extension of the conventional art.

In contrast, in the case of the steel of the embodiment, the creep rupture strength can be attained, for example, through a synergistic effect of combined addition with Ta, Nd, and Zr, restriction on a chemical composition, and higher degree of purification by restriction on an impurity element content.

There is no particular restriction on a method of producing the steel of the embodiment, and a publicly known method of producing an austenitic stainless steel may be appropriately adopted.

The steel of the embodiment may be the heat-treated steel plate or the heat-treated steel tube or pipe.

From the viewpoint of easy formation of a coarse grain structure and easy improvement of the high temperature strength (for example, creep rupture strength), the heating temperature of the heat treatment is preferably from 1050 to 1250° C., more preferably from 1150° C. to 1250° C.

Although there is no particular restriction on the mode of cooling after the heating during the heat treatment, and either of quenching (for example, water cooling) and air cooling is acceptable, quenching is preferable, and water cooling is more preferable.

The heat-treated steel plate or the heat-treated steel tube or pipe is obtained for example by preparing a steel plate or a steel tube or pipe having a chemical composition of the aforementioned steel of the embodiment, then heating the prepared steel plate or the prepared steel tube or pipe at, for example, from 1050 to 1250° C. (preferably from 1150° C. to 1250° C.), and thereafter cooling the same.

The steel plate or the steel tube or pipe having the chemical composition (a steel plate or a steel tube or pipe before a heat treatment) may be prepared according to an ordinary method.

A steel tube or pipe having the chemical composition may be prepared, for example, by casting a molten steel having the chemical composition to form a steel ingot or a steel billet, and performing at least one kind of a processing selected from the group consisting of hot extrusion, hot rolling, hot forging, cold drawing, cold rolling, cold forging, and cutting, on the obtained steel ingot, or steel billet.

Hereinabove the steel of the embodiment has been described.

There is no particular restriction on an application of the steel of the embodiment, and the steel of the embodiment may be applied to any application demanding securement of high temperature strength and stress corrosion cracking resistance.

The steel of the embodiment is a material steel suitable for, for example, a heat-resistant and pressure-resistant heat exchanger tube or a pipe for a boiler, a chemical plant, or the like; a heat-resistant forged product; a heat-resistant steel bar; or a heat-resistant steel plate.

The steel of the embodiment is a material steel especially suitable for a heat-resistant and pressure-resistant heat exchanger tube to be placed inside a boiler (for example, a heat-resistant and pressure-resistant heat exchanger tube with an outer diameter of from 30 to 70 mm, and a thickness of from 2 to 15 mm), or a pipe of boiler (for example, a pipe with an outer diameter of from 125 to 850 mm, and a thickness of from 20 to 100 mm).

EXAMPLES

Next, Examples of the invention will be described, but conditions in the Examples are just examples of conditions adopted for confirming the feasibility and effectiveness of the invention, and the invention is not limited to such condition examples. Indeed, many alternative conditions may be adopted for the invention, insofar as the object of the invention is achieved without departing from the spirit and scope of the invention.

In the Examples, 32 kinds of steels, whose chemical compositions are shown in Table 1 and Table 2 (Continuation of Table 1), were produced by melting.

In Table 1 and Table 2, Steels 1 to 18 are Inventive Steels which are examples of the invention (hereinafter also referred to as "Inventive Steels 1 to 18" respectively), and Steels 19 to 32 are Comparative Steels which are comparative examples (hereinafter also referred to as "Comparative Steels 19 to 32" respectively).

In this regard, Comparative Steel 19 is a steel corresponding to existing ASME SA213 TP310HCbN, and is a standard material for comparison between the prior art and Inventive Steels 1 to 18.

In melt-producing Inventive Steels 1 to 18, as a Fe source, high purity Fe obtained by smelting in a blast furnace and a converter and secondary refining by a vacuum oxygen degassing process was used, and as an alloy element, a high purity alloy element analyzed in advance was used. Further, before melt-producing any of Inventive Steels 1 to 18, the furnace for melt-producing Inventive Steels 1 to 18 was washed adequately, and special care was taken so as to prevent contamination with impurities.

Under the above special control, in producing Inventive Steels 1 to 18, the 6 impurity elements (specifically, Ti, Sn, Sb, Pb, As, and Bi) content, the O content, and the like were limited, and the Ta content, the Nd content, and the Zr content were regulated within an appropriate range.

In melt-producing Comparative Steels 19 to 32, the high purity Fe source was used also. Further, in melt-producing Comparative Steels 19 to 32, the chemical compositions were adjusted as follows.

In melt-producing Comparative Steels 19, 21, 24, 25, 27, and 28 at least one of the 6 impurity elements, or O (oxygen) was added intentionally.

In melt-producing Comparative Steels 19 to 23, and 29 to 31, at least one of Zr, Nd, or Ta was not added.

In melt-producing Comparative Steels 27, and 28, the addition amount of Zr or Nd was made excessive.

In melt-producing Comparative Steels 19, 20, 22, 24, 26, 27, and 32, the addition amount of an alloy element of Cr, Ni, or W was made excessive or insufficient.

TABLE 1

| Class | Steel | C | Si | Mn | P | S | Cr | Ni | Co | W | V | Nb | Al | B | N |
|---|---|---|---|---|---|---|---|---|---|---|---|---|---|---|---|
| Inventive Steel | 1 | 0.08 | 0.40 | 1.00 | 0.020 | 0.001 | 22.05 | 26.03 | 0.25 | 2.10 | 0.22 | 0.60 | 0.011 | 0.0030 | 0.170 |
|  | 2 | 0.05 | 0.15 | 1.85 | 0.005 | <0.001 | 23.00 | 29.55 | 0.22 | 3.45 | 0.68 | 0.41 | 0.008 | 0.0042 | 0.220 |
|  | 3 | 0.10 | 0.23 | 0.23 | 0.017 | <0.001 | 23.45 | 30.70 | 0.32 | 4.75 | 0.05 | 0.88 | 0.013 | 0.0039 | 0.170 |
|  | 4 | 0.07 | 0.35 | 1.03 | 0.011 | 0.002 | 25.30 | 28.75 | 0.20 | 2.50 | 0.34 | 0.52 | 0.023 | 0.0028 | 0.180 |
|  | 5 | 0.08 | 0.50 | 0.89 | 0.008 | 0.001 | 26.73 | 32.04 | 0.26 | 3.47 | 0.40 | 0.75 | 0.027 | 0.0037 | 0.210 |
|  | 6 | 0.04 | 0.31 | 2.50 | 0.004 | 0.002 | 25.42 | 33.20 | 0.31 | 2.90 | 0.69 | 0.29 | 0.025 | 0.0040 | 0.230 |
|  | 7 | 0.07 | 0.29 | 0.57 | 0.019 | 0.003 | 27.40 | 34.50 | 0.24 | 4.10 | 0.02 | 0.41 | 0.007 | 0.0028 | 0.190 |
|  | 8 | 0.05 | 0.45 | 2.05 | 0.013 | 0.001 | 24.19 | 31.00 | 0.20 | 3.97 | 0.55 | 0.64 | 0.003 | 0.0021 | 0.220 |
|  | 9 | 0.08 | 0.33 | 0.86 | 0.015 | 0.004 | 23.31 | 30.01 | 0.28 | 2.87 | 0.32 | 0.60 | 0.011 | 0.0035 | 0.190 |
|  | 10 | 0.09 | 0.43 | 1.60 | 0.010 | <0.001 | 23.78 | 29.88 | 0.21 | 2.71 | 0.45 | 0.65 | 0.002 | 0.0045 | 0.200 |
|  | 11 | 0.07 | 0.50 | 1.11 | 0.004 | <0.001 | 22.99 | 28.60 | 0.26 | 2.68 | 0.30 | 0.90 | 0.013 | 0.0024 | 0.180 |
|  | 12 | 0.10 | 0.32 | 0.38 | 0.005 | <0.001 | 22.04 | 31.04 | 0.55 | 2.80 | 0.27 | 0.71 | 0.008 | 0.0020 | 0.150 |
|  | 13 | 0.08 | 0.44 | 0.88 | 0.006 | 0.001 | 22.80 | 29.85 | 0.39 | 3.11 | 0.18 | 0.75 | 0.019 | 0.0023 | 0.190 |
|  | 14 | 0.06 | 0.48 | 1.31 | 0.010 | 0.002 | 23.47 | 27.41 | 0.21 | 2.45 | 0.66 | 0.45 | 0.014 | 0.0035 | 0.170 |
|  | 15 | 0.04 | 0.37 | 2.63 | 0.017 | 0.001 | 24.10 | 32.04 | 0.23 | 2.99 | 0.38 | 0.28 | 0.007 | 0.0052 | 0.280 |
|  | 16 | 0.06 | 0.28 | 2.10 | 0.011 | <0.001 | 25.30 | 30.14 | 0.30 | 2.67 | 0.47 | 0.42 | 0.012 | 0.0033 | 0.110 |
|  | 17 | 0.07 | 0.20 | 1.04 | 0.016 | <0.001 | 25.78 | 30.09 | 0.22 | 2.86 | 0.22 | 0.55 | 0.022 | 0.0022 | 0.220 |
|  | 18 | 0.06 | 0.39 | 1.31 | 0.015 | 0.002 | 26.40 | 31.02 | 0.40 | 3.07 | 0.36 | 0.43 | 0.015 | 0.0040 | 0.240 |
| Comparative Steel | 19 | 0.06 | 0.45 | 1.23 | 0.015 | 0.001 | 25.01 | <u>19.87</u> | 0 | <u>0</u> | <u>0</u> | 0.45 | 0.021 | <u>0</u> | 0.260 |
|  | 20 | 0.06 | 0.89 | 0.23 | 0.023 | 0.002 | 27.56 | 30.01 | 0.02 | <u>5.31</u> | 0.23 | 0.15 | 0.008 | 0.0060 | 0.020 |
|  | 21 | 0.07 | 0.23 | 0.15 | 0.021 | 0.003 | 22.75 | 27.85 | 0.12 | 2.04 | 0.20 | 0.30 | 0.012 | 0.0032 | 0.110 |
|  | 22 | 0.08 | 0.71 | 0.60 | 0.019 | 0.001 | <u>20.30</u> | 26.40 | 0.09 | 3.04 | 0.30 | 0.17 | 0.032 | 0.0041 | 0.380 |
|  | 23 | 0.11 | 0.36 | 0.52 | 0.028 | 0.003 | 25.63 | 26.05 | 0.18 | 2.53 | 0.45 | 0.20 | 0.024 | 0.0050 | 0.090 |
|  | 24 | 0.12 | 0.65 | 1.36 | 0.030 | 0.001 | <u>28.70</u> | <u>25.53</u> | 0.07 | 2.20 | 0.08 | 0.15 | 0.015 | 0.0024 | 0.170 |
|  | 25 | 0.10 | 0.42 | 1.07 | 0.019 | 0.001 | 26.30 | 27.82 | 0.17 | 2.90 | 0.17 | 0.21 | 0.009 | 0.0008 | 0.200 |
|  | 26 | 0.04 | 0.26 | 0.92 | 0.022 | 0.002 | <u>30.05</u> | 26.34 | 0.05 | 3.10 | 0.32 | 0.16 | 0.001 | 0.0035 | 0.260 |
|  | 27 | 0.05 | 0.31 | 0.80 | 0.020 | 0.005 | 22.85 | <u>25.84</u> | 0.09 | <u>1.90</u> | 0.36 | 0.20 | 0.027 | 0.0028 | 0.170 |
|  | 28 | 0.10 | 0.33 | 0.47 | 0.024 | 0.001 | 23.65 | 29.33 | 0.10 | 3.45 | 0.47 | 0.30 | 0.025 | 0.0041 | 0.240 |
|  | 29 | 0.03 | 0.32 | 0.55 | 0.028 | 0.008 | 22.00 | 26.20 | 0.02 | 2.08 | 0.05 | 0.16 | 0.002 | 0.0050 | 0.015 |
|  | 30 | 0.05 | 0.25 | 0.35 | 0.027 | 0.005 | 23.75 | 27.00 | 0.05 | 3.14 | 0.07 | 0.17 | 0.015 | 0.0074 | 0.024 |
|  | 31 | 0.09 | 0.15 | 0.20 | 0.015 | 0.015 | 25.40 | 26.15 | 0.02 | 2.78 | 0.20 | 0.30 | 0.025 | 0.0008 | 0.030 |
|  | 32 | 0.04 | 0.74 | 0.63 | 0.023 | 0.005 | 27.50 | 27.31 | 0.05 | <u>1.85</u> | 0.35 | 0.50 | 0.032 | 0.0042 | 0.120 |

TABLE 2

(Continuation of Table 1)

| Class | Steel | Zr | Nd | Ta | Ta + 0.8Nd + 0.5Zr | Ti | Sn | Sb | Pb | As | Bi | Sub-total (X) | O | Others |
|---|---|---|---|---|---|---|---|---|---|---|---|---|---|---|
| Inventive Steel | 1 | 0.002 | 0.015 | 0.010 | 0.023 | 0.005 | <0.001 | <0.001 | <0.001 | <0.001 | <0.001 | 0.005 | 0.0052 | Ca: 0.005, |
|  | 2 | 0.002 | 0.050 | 0.002 | 0.043 | <0.001 | <0.001 | <0.001 | <0.001 | <0.001 | <0.001 | 0 | 0.0027 | Ce: 0.01 |
|  | 3 | 0.050 | 0.020 | 0.050 | 0.091 | <0.001 | <0.001 | <0.001 | <0.001 | <0.001 | <0.001 | 0 | 0.0045 | Mo: 0.53 |
|  | 4 | 0.030 | 0.100 | 0.100 | 0.195 | 0.007 | 0.006 | <0.001 | <0.001 | <0.001 | <0.001 | 0.013 | 0.0065 | Y: 0.01 |
|  | 5 | 0.002 | 0.010 | 0.180 | 0.189 | <0.001 | <0.001 | <0.001 | <0.001 | <0.001 | <0.001 | 0 | 0.0033 | Hf: 0.002 |
|  | 6 | 0.100 | 0.170 | 0.005 | 0.191 | <0.001 | <0.001 | <0.001 | <0.001 | <0.001 | <0.001 | 0 | 0.0021 | Cu: 3.50 |
|  | 7 | 0.030 | 0.011 | 0.003 | 0.027 | 0.009 | <0.001 | <0.001 | <0.001 | <0.001 | <0.001 | 0.009 | 0.0070 | Cu: 2.30, |
|  | 8 | 0.007 | 0.080 | 0.110 | 0.178 | 0.005 | 0.005 | <0.001 | <0.001 | <0.001 | <0.001 | 0.010 | 0.0085 | Re: 0.005 |
|  | 9 | 0.010 | 0.004 | 0.130 | 0.138 | <0.001 | 0.005 | 0.002 | <0.001 | <0.001 | <0.001 | 0.007 | 0.0028 | Mo: 1.50, |
|  | 10 | 0.003 | 0.040 | 0.008 | 0.042 | <0.001 | <0.001 | <0.001 | <0.001 | <0.001 | <0.001 | 0.000 | 0.0025 | Cu: 3.00, |
|  | 11 | 0.110 | 0.050 | 0.090 | 0.185 | 0.005 | 0.008 | 0.001 | <0.001 | <0.001 | <0.001 | 0.014 | 0.0060 | La: 0.002 |
|  | 12 | 0.002 | 0.070 | 0.120 | 0.177 | <0.001 | 0.008 | <0.001 | <0.001 | <0.001 | <0.001 | 0.008 | 0.0088 | Sc: 0.005 |

TABLE 2-continued (Continuation of Table 1)

| Class | Steel | Zr | Nd | Ta | Ta + 0.8Nd + 0.5Zr | Ti | Sn | Sb | Pb | As | Bi | Sub-total (X) | O | Others |
|---|---|---|---|---|---|---|---|---|---|---|---|---|---|---|
| | 13 | 0.150 | 0.005 | 0.090 | 0.169 | 0.009 | 0.001 | <0.001 | <0.001 | <0.001 | <0.001 | 0.010 | 0.0074 | Mg: 0.001 |
| | 14 | 0.070 | 0.090 | 0.060 | 0.167 | <0.001 | 0.001 | 0.001 | <0.001 | <0.001 | <0.001 | 0.002 | 0.0055 | Y: 0.02, |
| | 15 | 0.003 | 0.004 | 0.030 | 0.035 | <0.001 | <0.001 | <0.001 | <0.001 | <0.001 | <0.001 | 0 | 0.0038 | Ce: 0.01 |
| | 16 | 0.075 | 0.060 | 0.002 | 0.088 | 0.008 | <0.001 | <0.001 | <0.001 | <0.001 | <0.001 | 0.008 | 0.0020 | |
| | 17 | 0.030 | 0.120 | 0.080 | 0.191 | 0.005 | 0.003 | <0.001 | <0.001 | <0.001 | <0.001 | 0.008 | 0.0075 | |
| | 18 | 0.002 | 0.080 | 0.120 | 0.185 | <0.001 | <0.001 | <0.001 | <0.001 | <0.001 | <0.001 | 0 | 0.0073 | |
| Compar- | 19 | <0.001 | <0.001 | <0.001 | 0 | 0.015 | 0.040 | 0.010 | 0.001 | <0.001 | <0.001 | 0.066 | 0.0085 | |
| ative | 20 | <0.001 | <0.001 | 0.150 | 0.150 | <0.001 | <0.001 | 0.009 | <0.001 | <0.001 | <0.001 | 0.009 | 0.0089 | |
| Steel | 21 | <0.001 | 0.020 | 0.005 | 0.021 | 0.008 | 0.009 | 0.001 | 0.002 | <0.001 | <0.001 | 0.020 | 0.0075 | |
| | 22 | <0.001 | 0.030 | <0.001 | 0.024 | 0.007 | <0.001 | <0.001 | <0.001 | <0.001 | <0.001 | 0.007 | 0.0080 | |
| | 23 | 0.150 | <0.001 | <0.001 | 0.075 | 0.006 | 0.005 | <0.001 | <0.001 | <0.001 | <0.001 | 0.011 | 0.0090 | |
| | 24 | 0.010 | 0.005 | 0.020 | 0.029 | 0.015 | <0.001 | <0.001 | <0.001 | <0.001 | <0.001 | 0.015 | 0.0081 | |
| | 25 | 0.120 | 0.001 | 0.130 | 0.191 | 0.009 | 0.009 | 0.007 | 0.001 | 0.001 | 0.001 | 0.028 | 0.0077 | |
| | 26 | 0.002 | 0.003 | 0.080 | 0.083 | 0.003 | 0.005 | 0.008 | <0.001 | <0.001 | <0.001 | 0.016 | 0.0056 | |
| | 27 | 0.002 | 0.250 | 0.001 | 0.202 | 0.001 | 0.008 | <0.001 | <0.001 | <0.001 | <0.001 | 0.009 | 0.0120 | |
| | 28 | 0.210 | 0.001 | 0.002 | 0.108 | <0.001 | <0.001 | 0.008 | 0.001 | 0.001 | <0.001 | 0.010 | 0.0150 | |
| | 29 | <0.001 | 0.002 | 0.035 | 0.037 | 0.005 | 0.004 | <0.001 | <0.001 | <0.001 | <0.001 | 0.009 | 0.0085 | |
| | 30 | 0.055 | 0.003 | <0.001 | 0.030 | 0.003 | 0.006 | 0.001 | 0.001 | <0.001 | <0.001 | 0.011 | 0.0079 | |
| | 31 | 0.020 | <0.001 | 0.020 | 0.030 | 0.001 | 0.009 | 0.003 | 0.001 | 0.001 | <0.001 | 0.015 | 0.0088 | |
| | 32 | 0.010 | 0.003 | 0.100 | 0.107 | 0.008 | 0.003 | 0.010 | 0.001 | 0.001 | <0.001 | 0.023 | 0.0075 | |

—Explanation of Table 1 and Table 2—

A numerical value represents the content of each element (% by mass).

An underlined numerical value is a value outside the range of the chemical composition of the embodiment.

A remainder of each steel excluding the elements listed in Table 1 and Table 2 is Fe and impurities.

In a calculation of "Ta+0.8Nd+0.5Zr", "Ta+0.8Nd+0.5Zr" was calculated by regarding the content as 0% with respect to an element which content is less than 0.001% (written in Table 2 as "<0.001").

Sub-total (X) shows the total content (% by mass) of the 6 impurity elements (specifically, Ti, Sn, Sb, Pb, As, and Bi). In this regard, for an element with a content of less than 0.001% (written as "<0.001" in Table 2), the sub-total (X) was calculated by regarding the content of the element as 0%.

<Production and Heat Treatment (1200° C.) of Test Material>

A steel having an chemical composition shown in Table 1 and Table 2 was produced by melting by vacuum melting and cast to obtain a 50 kg-steel ingot.

By hot forging the obtained steel ingot, a 15 mm-thick steel plate was obtained.

By cutting a surface of the obtained 15 mm-thick steel plate, an approximately 12 mm-thick steel plate was obtained.

By performing cold rolling on the obtained approximately 12 mm-thick steel plate at a cross-section reduction rate of approximately 30%, an approximately 8 mm-thick platy test material was obtained.

A heat treatment at 1200° C. was performed on the test material by heating the test material to 1200° C., then keeping test material at 1200° C. for 15 min, and thereafter cooling the test material with water. By the heat treatment, both the metallic structures of a test material of an Inventive Steel and a test material of a Comparative Steel were converted to a coarse grain structure with an ASTM grain size number (ASTM E112) of 7 or less.

<Stress Corrosion Cracking Test on Base Material>

A corrosion test piece with a width of 10 mm×a thickness of 4 mm×a length of 40 mm was sliced out from the heat-treated test material. The sliced out corrosion test piece is hereinafter called as a "base material".

The base material was subjected to a thermal aging treatment at 650° C. for 100 hours for execution of a corrosion cracking evaluation under a severe condition.

A Strauss test (ASTM A262, Practice E: Sensitization evaluation) was performed as a stress corrosion cracking test on the base material after the thermal aging treatment, and the crack depth and the cracking state were observed.

The results are shown in Table 3.

A stress corrosion cracking test after a thermal aging treatment under the above conditions is a severe test, which has been heretofore not performed quantitatively with respect to a high Cr-based austenitic stainless steel.

<Stress Corrosion Cracking Test on Weld HAZ Equivalent Material>

A corrosion test piece with a width of 10 mm×a thickness of 4 mm×a length of 40 mm was sliced out from the heat-treated test material.

The sliced-out test piece was heated at 950° C. for 25 sec using a Greeble tester (Joule heating in vacuum). A weld HAZ equivalent material (i.e. a weld heat affected zone equivalent material) was obtained by blowing He for cooling after the heating.

A thermal aging treatment similar to the thermal aging treatment on a base material was conducted on the obtained weld HAZ equivalent material in order to perform a corrosion cracking evaluation under a severe condition as in the case of a base material.

A Strauss test (ASTM A2622, Practice E: Sensitization evaluation) was conducted as a stress corrosion cracking test on a weld HAZ equivalent material after the thermal aging treatment, as on a base material, and the crack depth and the cracking state were observed.

The results are shown in Table 3.

<High Temperature Strength>

A creep rupture test piece with a size of 6 mmϕ and a length of the parallel portion of 30 mm was cut out from the heat-treated test material, whose longitudinal direction was the longitudinal direction of the test piece. The creep rupture test piece was subjected to a long term creep rupture test at 750° C. for 10,000 hours or longer, and an average creep rupture strength (MPa) at 750° C. and 100,000 hours was estimated as a high temperature strength.

The results are shown in Table 3.

TABLE 3

| Class | Steel | Stress corrosion cracking test (Observation results of cracking state and maximum crack depth) | | High temperature strength (Creep rupture strength at 750° C. and 100,000 hours) (MPa) |
|---|---|---|---|---|
| | | Base material | Weld HAZ equivalent material | |
| Inventive Steel | 1 | Grain boundary cracking <10 μm | Grain boundary cracking <10 μm | 59 |
| | 2 | Grain boundary cracking <10 μm | Grain boundary cracking <10 μm | 65 |
| | 3 | Grain boundary cracking <10 μm | Grain boundary cracking <10 μm | 70 |
| | 4 | Grain boundary cracking <10 μm | Grain boundary cracking <10 μm | 59 |
| | 5 | Grain boundary cracking <10 μm | Grain boundary cracking <10 μm | 62 |
| | 6 | Grain boundary cracking <10 μm | Grain boundary cracking <10 μm | 63 |
| | 7 | Grain boundary cracking <10 μm | Grain boundary cracking <10 μm | 58 |
| | 8 | Grain boundary cracking <10 μm | Grain boundary cracking <10 μm | 59 |
| | 9 | Grain boundary cracking <10 μm | Grain boundary cracking <10 μm | 60 |
| | 10 | Grain boundary cracking <10 μm | Grain boundary cracking <10 μm | 68 |
| | 11 | Grain boundary cracking <10 μm | Grain boundary cracking <10 μm | 72 |
| | 12 | Grain boundary cracking <10 μm | Grain boundary cracking <10 μm | 69 |
| | 13 | Grain boundary cracking <10 μm | Grain boundary cracking <10 μm | 61 |
| | 14 | Grain boundary cracking <10 μm | Grain boundary cracking <10 μm | 63 |
| | 15 | Grain boundary cracking <10 μm | Grain boundary cracking <10 μm | 65 |
| | 16 | Grain boundary cracking <10 μm | Grain boundary cracking <10 μm | 59 |
| | 17 | Grain boundary cracking <10 μm | Grain boundary cracking <10 μm | 62 |
| | 18 | Grain boundary cracking <10 μm | Grain boundary cracking <10 μm | 60 |
| Comparative Steel | 19 | Many cracks of 2 to 3 mm | Many cracks of 3 mm or deeper | 42 |
| | 20 | Many cracks of 3 mm or deeper | Through cracking | 30 |
| | 21 | Many cracks of 2 to 3 mm | Many cracks of 3 mm or deeper | 47 |
| | 22 | Many cracks of 3 mm or deeper | Through cracking | 55 |
| | 23 | Many cracks of 3 mm or deeper | Through cracking | 50 |
| | 24 | Through cracking | Through cracking | 51 |
| | 25 | Many cracks of 3 mm or deeper | Through cracking | 52 |
| | 26 | Many cracks of 3 mm or deeper | Many cracks of 3 mm or deeper | 35 |
| | 27 | Many cracks of 2 to 3 mm | Many cracks of 3 mm or deeper | 38 |
| | 28 | Many cracks of 2 to 3 mm | Many cracks of 3 mm or deeper | 33 |
| | 29 | Many cracks of 2 to 3 mm | Many cracks of 3 mm or deeper | 58 |
| | 30 | Many cracks of 2 to 3 mm | Many cracks of 3 mm or deeper | 55 |
| | 31 | Many cracks of 2 to 3 mm | Many cracks of 3 mm or deeper | 59 |
| | 32 | Grain boundary cracking <10 μm | Grain boundary cracking <10 μm | 28 |

As shown in Table 3, in Inventive Steels 1 to 18, stress corrosion cracking was suppressed remarkably compared to Comparative Steels 19 to 31, such that merely grain boundary cracking with a depth of less than 10 μm appeared in the base material and the weld HAZ equivalent material.

From this result, it has been demonstrated that Inventive Steels 1 to 18 exhibit superior stress corrosion cracking resistance even in a severely corrosive environment.

In contrast to Inventive Steels 1 to 18, in a steel corresponding to a conventional general-purpose steel TP347HCbN (Comparative Steel 19), many large cracks with a depth of 2 mm or more were generated in both the base material and the weld HAZ equivalent material.

Similarly, in Comparative Steels 20 to 31 as well, many large cracks with a depth of 2 mm or more, or through cracking, which is more serious cracking, was generated in both the base material and the weld HAZ equivalent material.

From a comparison of Comparative Steels 1 to 18, with Comparative Steel 20, in which the Ta content was appropriate, but Nd and Zr were insufficient, as well as Comparative Steels 21 to 23, and 27 to 31, in which at least one of Nd, Ta, or Zr was insufficient or excessive, it has been demonstrated that it is necessary for suppressing stress corrosion cracking under a severe condition to control Ta, Nd, Zr, and Ta+0.8Nd+0.5Nd to appropriate contents.

From a comparison of Inventive Steels 1 to 18, with Comparative Steels 24 and 25, in which the contents of Ta, Nd, Zr, and Ta+0.8Nd+0.5Nd were appropriate, but Ti as one of the 6 impurity elements, or the total of the 6 impurity elements (sub-total (X)) was excessive, it has been demonstrated that it is necessary for suppressing stress corrosion cracking under a severe condition not only to control Ta, Nd, Zr, and Ta+0.8Nd+0.5Nd to appropriate contents, but also to limit the contents of the 6 impurity elements.

As shown in Table 3, Inventive Steels 1 to 18 exhibited a superior high temperature strength of 58 MPa or more. The high temperature strength of Inventive Steels 1 to 18 was about 1.4 times higher or more than the high temperature strength of Comparative Steel 19 (general-purpose steel TP310HCbN steel).

In contrast, the high temperature strengths of, for example, Comparative Steels 19 to 21, 26 to 28, and 32 were 47 MPa or less, and inferior to the high temperature strengths of Inventive Steels 1 to 18.

Especially, from a comparison of Inventive Steels 1 to 18 with Comparative Steels 20, 27, and 32, in which W was insufficient or excessive, it has been demonstrated that it is necessary for improving a high temperature strength to control the W content to an appropriate level.

The entire contents of the disclosures by Japanese Patent Application No. 2015-120592 are incorporated herein by reference.

All documents, patent applications, and technical standards described in this specification are herein incorporated by reference to the same extent as if each individual document, patent application, or technical standard was so specifically and individually indicated to be incorporated by reference.

The invention claimed is:

1. A high Cr-based austenitic stainless steel with a chemical composition consisting of in terms of % by mass:
   0.03 to 0.12% of C,
   0.10 to 1.00% of Si,
   0.10 to 3.00% of Mn,
   0.030% or less of P,
   0.020% or less of S,
   21.50 to 28.00% of Cr,
   more than 26.00 and not more than 35.00% of Ni,
   more than 2.00 and not more than 5.00% of W,
   0.80% or less of Co,
   0.01 to 0.70% of V,
   0.15 to 1.00% of Nb,
   0.001 to 0.040% of Al,
   0.0001 to 0.0100% of B,
   0.010 to 0.400% of N,
   0.001 to 0.200% of Zr,
   0.001 to 0.200% of Nd,
   0.001 to 0.200% of Ta,
   0.020 to 0.200% of Ta+0.8Nd+0.5Zr,
   0.010% or less of Ti,
   0.010% or less of Sn,
   0.010% or less of Sb,
   0.001% or less of Pb,
   0.001% or less of As,
   0.001% or less of Bi,
   0.025% or less of Ti+Sn+Sb+Pb+As+Bi,
   0.0090% or less of O,
   4.00% or less of Cu,
   2.00% or less of Mo,
   0.20% or less of Ca,
   0.20% or less of Mg,
   0.20% or less in total of one or more of Y, Sc, Hf, Re, or lanthanoid elements other than Nd, and a remainder consisting of Fe and impurities.

2. The high Cr-based austenitic stainless steel according to claim 1, wherein the chemical composition comprises, in terms of % by mass, 0.01 to 0.80% of Co.

3. The high Cr-based austenitic stainless steel according to claim 1, wherein the chemical composition comprises, in terms of % by mass, one or more of: 0.01 to 4.00% of Cu, 0.01 to 2.00% of Mo, 0.0001 to 0.20% of Ca, or 0.0005 to 0.20% of Mg.

4. The high Cr-based austenitic stainless steel according to claim 1, wherein the chemical composition comprises, in terms of % by mass, 0.001 to 0.20% in total of one or more of Y, Sc, Hf, Re, or lanthanoid elements other than Nd.

5. The high Cr-based austenitic stainless steel according to claim 1, wherein a creep rupture strength at 750° C. and 100,000 hours is 50 MPa or more.

6. The high Cr-based austenitic stainless steel according to claim 2, wherein the chemical composition comprises, in terms of % by mass, one or more of: 0.01 to 4.00% of Cu, 0.01 to 2.00% of Mo, 0.0001 to 0.20% of Ca, or 0.0005 to 0.20% of Mg.

7. The high Cr-based austenitic stainless steel according to claim 2, wherein the chemical composition comprises, in terms of % by mass, 0.001 to 0.20% in total of one or more of Y, Sc, Hf, Re, or lanthanoid elements other than Nd.

8. The high Cr-based austenitic stainless steel according to claim 2, wherein a creep rupture strength at 750° C. and 100,000 hours is 50 MPa or more.

9. The high Cr-based austenitic stainless steel according to claim 3, wherein the chemical composition comprises, in terms of % by mass, 0.001 to 0.20% in total of one or more of Y, Sc, Hf, Re, or lanthanoid elements other than Nd.

10. The high Cr-based austenitic stainless steel according to claim 3, wherein a creep rupture strength at 750° C. and 100,000 hours is 50 MPa or more.

11. The high Cr-based austenitic stainless steel according to claim 4, wherein a creep rupture strength at 750° C. and 100,000 hours is 50 MPa or more.

12. A high Cr-based austenitic stainless steel with a chemical composition comprising in terms of % by mass:
    0.03 to 0.12% of C,
    0.10 to 1.00% of Si,
    0.10 to 3.00% of Mn,
    0.030% or less of P,
    0.020% or less of S,
    21.50 to 28.00% of Cr,
    more than 26.00 and not more than 35.00% of Ni,
    more than 2.00 and not more than 5.00% of W,
    0.80% or less of Co,
    0.01 to 0.70% of V,
    0.15 to 1.00% of Nb,
    0.001 to 0.040% of Al,
    0.0001 to 0.0100% of B,
    0.010 to 0.400% of N,
    0.001 to 0.200% of Zr,
    0.001 to 0.200% of Nd,
    0.001 to 0.200% of Ta,
    0.020 to 0.200% of Ta+0.8Nd+0.5Zr,
    0.010% or less of Ti,
    0.010% or less of Sn,
    0.010% or less of Sb,
    0.001% or less of Pb,
    0.001% or less of As,
    0.001% or less of Bi,
    0.025% or less of Ti+Sn+Sb+Pb+As+Bi,
    0.0090% or less of O,
    4.00% or less of Cu,
    2.00% or less of Mo,
    0.20% or less of Ca,
    0.20% or less of Mg,
    0.20% or less in total of one or more of Y, Sc, Hf, Re, or lanthanoid elements other than Nd, and a remainder comprising Fe and impurities.

13. The high Cr-based austenitic stainless steel according to claim 12, wherein the chemical composition comprises, in terms of % by mass, 0.01 to 0.80% of Co.

14. The high Cr-based austenitic stainless steel according to claim 12, wherein the chemical composition comprises, in terms of % by mass, one or more of: 0.01 to 4.00% of Cu, 0.01 to 2.00% of Mo, 0.0001 to 0.20% of Ca, or 0.0005 to 0.20% of Mg.

15. The high Cr-based austenitic stainless steel according to claim 12, wherein the chemical composition comprises, in terms of % by mass, 0.001 to 0.20% in total of one or more of Y, Sc, Hf, Re, or lanthanoid elements other than Nd.

16. The high Cr-based austenitic stainless steel according to claim 12, wherein a creep rupture strength at 750° C. and 100,000 hours is 50 MPa or more.

* * * * *